United States Patent [19]
Hepworth et al.

[11] 3,975,712
[45] Aug. 17, 1976

[54] ASYNCHRONOUS COMMUNICATION INTERFACE ADAPTOR

[75] Inventors: Edward C. Hepworth, Apache Junction; Rodney J. Means, Tempe, both of Ariz.; Charles I. Peddle, Norristown, Pa.

[73] Assignee: Motorola, Inc., Chicago, Ill.

[22] Filed: Feb. 18, 1975

[21] Appl. No.: 550,336

[52] U.S. Cl. .................. 340/147 R; 178/58 R; 179/15 BA; 340/172.5
[51] Int. Cl.² .................. G06F 3/00; H04J 3/00; H04Q 5/00
[58] Field of Search ............ 340/147 R; 179/2 DP, 179/15 A, 15 AQ, 15 AT, 15 AL, 15 BA; 178/58 R

[56] References Cited
UNITED STATES PATENTS

| | | | |
|---|---|---|---|
| 3,601,807 | 8/1971 | Beausoleil et al. | 340/147 C |
| 3,629,831 | 12/1971 | Mikus et al. | 340/152 |
| 3,683,415 | 8/1972 | Lloyd et al. | 340/147 C |
| 3,699,525 | 10/1972 | Klavins | 340/172.5 |
| 3,764,977 | 10/1973 | Weeden, Jr. | 340/147 R |
| 3,818,142 | 6/1974 | Edstrom et al. | 179/15 AQ |
| 3,821,480 | 6/1974 | Dundon et al. | 179/15 A |
| 3,826,872 | 7/1974 | MacGregor | 179/15 A |
| 3,854,007 | 12/1974 | Hatton | 178/58 R |
| 3,866,175 | 2/1975 | Seifert, Jr. et al. | 340/151 X |
| 3,868,640 | 2/1975 | Binnie et al. | 340/151 |
| 3,892,925 | 7/1975 | Fisk et al. | 179/15 A X |
| 3,937,925 | 2/1976 | Boothroyd | 340/152 R |

*Primary Examiner*—Donald J. Yusko
*Attorney, Agent, or Firm*—Harry M. Weiss; Charles R. Hoffman

[57] ABSTRACT

An integrated circuit asynchronous communications interface adapter (ACIA) includes circuitry on a semiconductor chip for interfacing with a bidirectional data bus of a microcomputer. Bus interface circuitry on the ACIA chip controls data transfer between the microcomputer data bus and a transmit data register and a read data register on the ACIA chip. Transmitting circuitry on the ACIA chip converts data from a parallel format to a serial format. Receiving circuitry on the ACIA chip accepts data in a serial format and converts it to a parallel format prior to transferring it to a receive data register. A control register controls data transfer throughout the ACIA chip. A status register on the ACIA chip may be interrogated under program control to determine the status of registers and/or correctness of data format, status of interrupt logic or modem control lines. Several Modem and/or peripheral control functions, including a "clear-to-send" input, a "request-to-send" output and a "data-carrier-loss detected" input are provided by circuitry on the ACIA chip.

21 Claims, 4 Drawing Figures

ASYNCHRONOUS COMMUNICATION INTERFACE ADAPTOR

RELATED APPLICATIONS

This application is related to assignee's copending U.S. patent applications Ser. No. 519,138 "Interface Adapter Architecture," Ser. No. 519,150 "Microprocessor Architecture," and Ser. No. 519,149 "Microprocessor System" by Bennett et al., all filed on Oct. 30, 1974, and to assignee's copending U.S. patent Applications, "Logic Circuitry for Selection of Dedicated Registers," Ser. No. 550,338, "Interrupt Status Indication Logic for Polled Interrupt Digital System," Ser. No. 550,340 "Asynchronous Status Interlock Circut for Interface Adapter," Ser. No. 550,883 and "Digital System with Peripheral Control of Interface Adapter," Ser. No. 550,311, all by Hepworth, et al. on Feb. 18, 1975.

BACKGROUND OF THE INVENTION

A large number of minicomputers are presently available. More recently, microcomputers utilizing bidirectional data busses have become available. A variety of specialized circuits in integrated circuit form have been utilized to interface between such bidirectional data busses and a variety of peripheral devices controlled by and interacting with microcomputers, such as, keyboards, printers, control displays, readers, plotters, etc. Circuits have also been provided to interface between bidirectional data busses and modems (modulator-demodulator) to allow the microcomputer to control remote equipment over a telephone line by converting data in a parallel word format to a serial word format, supplying signals representing the serial word format to a modem which sends data over a telephone line. Such modem circuits also receive data in a serial format from a telephone line, via an accoustic coupler, and transfer the data to an adaptor circuit which changes the data from the serial word format to a parallel word format and write it onto the bidirectional data bus.

The MOS (metal-oxide-semiconductor) technology has been utilized to provide a microcomputer using microprocessor unit chips (MPU's) integrated on a single semiconductor chip. Integrated circuit random access memory chips (RAM) and read only memory (ROM) chips and suitable interface adaptor chips for coupling the bidirectional data bus to peripheral equipment have also been provided by the MOS technology. Thereby, the power of computer data processing is made available at very low cost for use in a wide variety of industrial communications equipment. However, to take advantage of such low cost microcomputer systems to the fullest extent, it is often necessary to provide an efficient means of interfacing between the system data bus and peripheral devices which transmit and receive data asynchronously.

In the past, in order to permit communication between a bidirectional data bus and, for example, a modem, integrated circuits capable of providing both serial-to-parallel conversion for a receiving section thereof and parallel-to-serial conversion for a transmitting section thereof on a single chip, along with formating circuitry have been utilized. It has been necessary to provide additional complex bus interface circuitry, separate from said chip, which is capable of receiving data from and transmitting data onto the bidirectional data bus and accepting or receiving data from said chip. This has required additional semiconductor packages, lower component density of the final product, and consequently higher costs.

SUMMARY OF THE INVENTION

It is an object of this invention to provide a low cost integrated circuit for communicating with a bidirectional data bus of a digital system.

It is another object of this invention to provide an asynchronous interface adaptor including data transmitting circuitry which converts data received on a bidirectional data bus from a parallel word format to a serial word format, data receiving circuitry capable of receiving asynchronous data in a serial word format and converting it to a parallel word format, and interface and control circuitry for interfacing between the bidirectional data bus and the data transmitting circuitry and the data receiving circuitry.

Briefly described, the invention is a digital system adapted for asynchronous data communication including transmitting circuitry for formating and serializing parallel data received from a bidirectional data bus, receiving circuitry for receiving serial data from peripheral communications equipment, such as a modem, and converting it to a parallel format, and bus interface circuitry coupled to the transmitting and receiving circuitry for controlling the receiver circuitry and the transmitter circuitry and for transferring data between a bidirectional data bus and the transmitting and receiving circuitry. In a presently preferred embodiment of the invention, the digital system includes a status register for allowing the status of the registers and various points within the circuit to be monitored under program control by microprocessor circuit connected to the bidirectional data bus. Another embodiment further includes modem control circuitry

DESCRIPTION OF THE INVENTION

Figure 1:
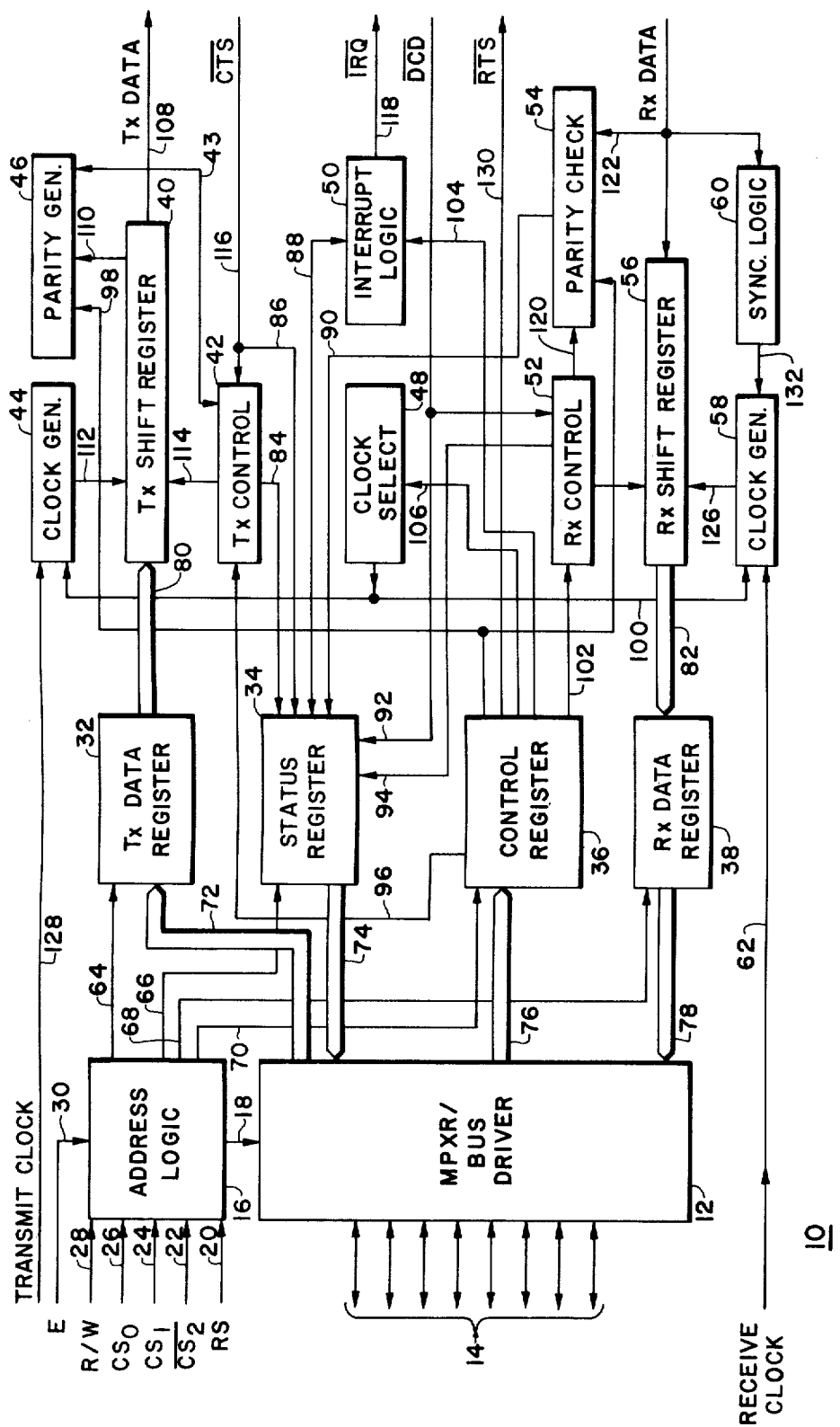
FIG. 1 is a block diagram of an asychronous communications interface adaptor chip according to a presently preferred embodiment of the invention.

FIG. 1 is a block diagram of an integrated circuit version of an asynchronous interface adapter (ACIA) circuit according to the invention. ACIA chip 10 has eight bidirectional data input/output lines forming a bidirectional data bus 14 connected to multiplexor (MPXR) bus driver circuitry 12 of ACIA chip 10. Enable (E) input 30, read/write (R/W) input 28, chip select inputs 26, 24, and 22 (also designated, respectively by $CS_0$, $CS_1$, and $\overline{CS_2}$) and register select (RS) input 20 are all connected to address logic circuitry 16, which is coupled to multiplexor bus driver circuitry 12 (referred to hereinafter as buffer circuitry 12) by means of one or more connections 18. In FIG. 1 the arrows indicate the usual direction of signal or data flow to or from a particular block of circuitry. Some of the solid lines are to be understood to represent a single conductor, while others may represent a plurality of separate conductors. The wide coupling elements such as by 72, 74, 76, 78, etc., represent buses which may include, for example, eight conductors for a one byte word system. The pointed ends of the buses indicate the direction of data flow and the same general format as exists and when the data received or driven by bidirectional data bus 14.

ACIA chip 10 includes four internal registers, including transmit data register 32, (designated TX Data Register in FIG. 1) receive data register 38 (designated RX Data Register in FIG. 1), control register 36, and status register 34. Address logic 16 causes one of the above mentioned registers to be selected, via connections 64, 66, 68, and 70, which are also connected, respectively, to transmit data register 32, status register 34, control register 36, and receive data register 38. Transmit data register 32 is coupled to buffer circuitry 12 by means of bus 72. Status register 34 is coupled to buffer circuitry 12 by means of bus 74. Control register 36 is coupled to buffer circuitry 12 by means of bus 76. Receive data register 38 is coupled to buffer circuitry 12 by bus 78.

Transmit data register 32, which is a write only register, is connected by means of bus 80 to transmit shift register 40. Data in transmit data register 32 is shifted in parallel to shift register 40 and transmitted onto transmit data line 108 (designated TX Data) in serial format, in accordance with a clock signal being supplied on conductor 112 connected to transmit shift register 40 and to clock generator 44. The clock signal on conductor 112 is derived from input transmit clock 128. The divide ratio between the signal on conductor 128 and the signal on conductor 112 is determined by an internal control signal on conductor 100, which is connected to clock generator 44, clock generator 58, parity check circuit 54, and clock select circuit 48. Parity generator circuit 46 is connected to transmit shift register 40 by means of a plurality of conductors 110 and is also connected to control register 36 by means of conductor 98. Parity generator 46 and transmitter control circuit 42 are coupled by conductor 43. Receive data register 38 is connected to receive shift register 56 by data bus 82. Data applied in serial form on receive data conductor 122 (designated RX Data), which is coupled to sync logic circuit 60 and parity check circuit 54 and receive shift register 56, is loaded into receive shift register 56 into a serial format at a rate determined by a signal generated by clock generator 58 and applied to receive shift register 56 by means of conductor 126. The data is then shifted in parallel by means of bus 82 to receive data register 38.

Control register 36 stores and generates signals which control the various data transfers occurring in ACIA chip 10, and is connected to request-to-send (RTS) conductor 130, and is also connected to clock select circuitry 48 by means of conductor 106, and to interrupt logic circuitry 50 by means of conductor 104, and to receive control circuit 52 by means of conductor 102, and to transmit control circuit 42 by conductor 96.

Receiver control circuit 52 is connected to parity check circuit 54 by means of conductor 120.

Status register 34 is, in a presently preferred embodiment of the invention, an eight bit register which stores information representative of the status of various conductors and circuits in ACIA chip 10. Status register 34 is connected to transmit control circuit 42 by means of conductor 84, clear to send (CTS) conductor 116, by means of conductor 86. CTS is also connected to transmit control circuit 42. Status register 34 is connected to interrupt logic circuitry 50 by means of conductor 88, and to parity check circuit 54 by means of conductor 90 and to data carrier detect loss (DCD) conductor 92 and to recover control circuit 52 by means of conductor 94. Sync logic circuit 60 is connected to clock generator circuit by means of conductor 132. Transmit control circuit 42 is connected to status register 34 by conductor 84 and to control register 36 by conductor 96. Receiver control circuit 52 is connected to status register 34 by conductor 94 and to control register 36 by conductor 102.

Figure 2:
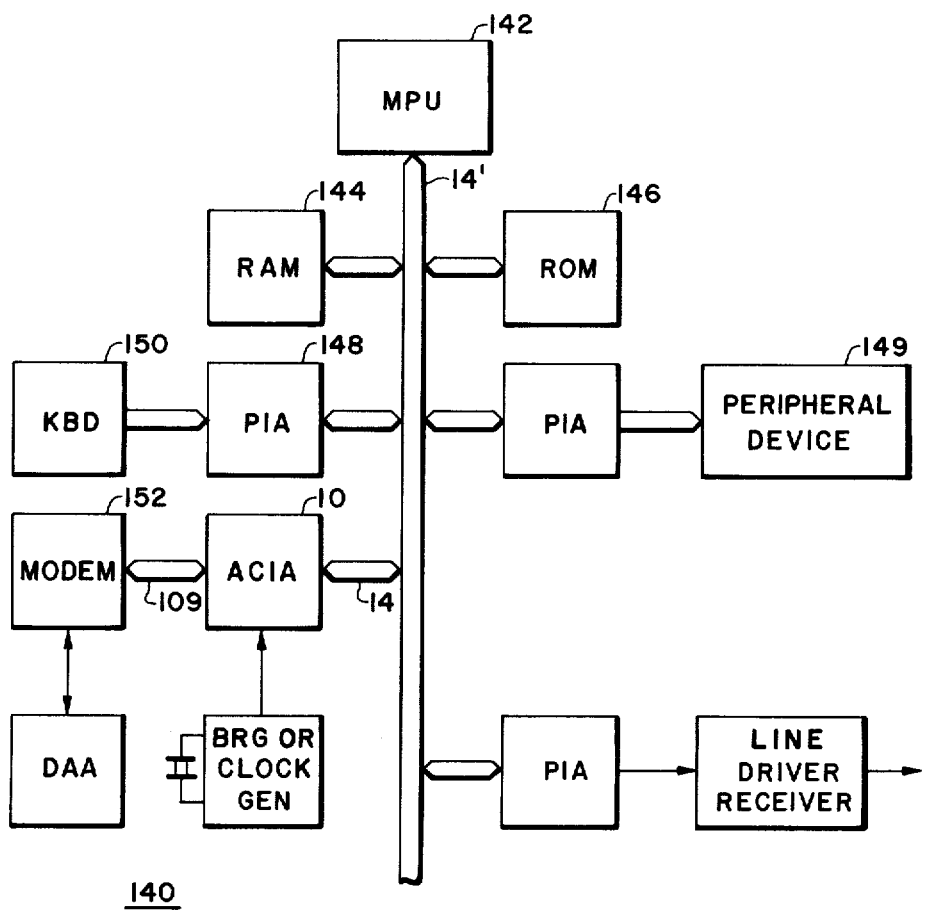
FIG. 2 is a block diagram of a microcomputer system in which the asychronous communications interface adaptor of FIG. 1 may be utilized.

FIG. 2 is a block diagram of a typical microcomputer system in which the presently preferred embodiment of the asynchronous communications interface adaptor may be utilized. Microcomputer 140 includes microprocessor chip 142, which may be as described in the above mentioned patent application Ser. No. 519,150 Microprocessor circuit 142 is connected to a bidirectional data bus 14'. Random access memory (RAM) 144 and read only memory (ROM) 146 are connected, respectively, by means of their data bus lines, to the data conductors which constitute bidirectional data bus 14'. A plurality of peripheral interface adaptor chips 148 are connected by means of their bidirectional data input output conductors to the respective conductors of data bus 14'. (It will be understood that chips 142, 148, 10, etc. may be packaged in suitable semiconductor packages, such as dual-in-line packages). An exemplary peripheral interface adaptor is described in detail in copending patent application Ser. No. 519,138 mentioned above. A peripheral interface adaptor unit such as 148 may be utilized to couple peripheral devices such as key board 150 to data bus 14' to allow microprocessor 142 to communicate therewith. Peripheral interface adaptors may also be used to couple other peripheral devices, such as teletypes, (TTY), cathode ray tubes (CRT), control panels, cassettes, etc., designated in FIG. 2 by reference numeral 149.

ACIA chip 10, as shown in FIG. 1, may be connected by means of data bus 14 to microcomputer data bus 14'. A modem 152 may be connected to conductors 109, which may perform the functions of receiving data, transmitting data, and modem control.

Figure 3:
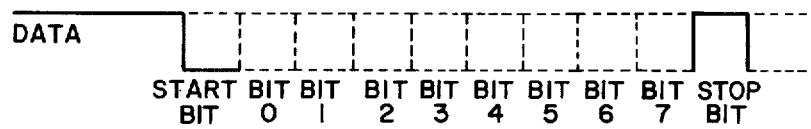
FIG. 3 is a diagram of a serial data word format and is useful in explaining the invention.

An asynchronous communications interface adaptor according to the invention provides the communications data formatting function as well as the means for controlling a modum or other communications peripheral. It provides the required address and internal register selection logic circuitry, chip enable logic circuitry, control (R/W) logic circuitry and bus interface logic for compatibility with a microprocessing unit (MPU) chip. The ACIA performs three distinct functions: asynchronous data transmission, asynchronous data reception, and limited modem control. In a presently preferred embodiment the ACIA according to the invention provides the capability to transmit and receive eight-bit or nine-bit words including optional parity bits, plus associated start and stop bits. FIG. 3 shows the serial word format including start and stop bits. Parity bits, not shown, may be inserted. A preferred design provides for separate data rates for transmitting and receiving.

ACIA chip 10 has an interrupt circuit 50 which acts on internal signals derived from three independent sources, the transmitter section, the receiver section, and the modum control interface section. The transmit data register 32 being empty will cause such an internal interrupt signal. The interrupt logic 50 is automatically reset by loading the transmitter data register from the buffer 12. The receive data register 38 being full (i.e., containing a character, i.e., word) will cause an internal interrupt signal to be generated by status register 34 on conductor 88 which will automatically be reset when received data is read, i.e., loaded by ACIA chip 10 onto bidirectional data bus 14 when R/W conductor 28 is at a logical "1". A loss of data carrier ($\overline{DCD}$) going high) will cause bit of status register 34 to be set, and causes the receiver section to be reset. The interrupt caused by $\overline{DCD}$ will be cleared when the status and receiver data register are read. The $\overline{DCD}$ status bit will be cleared when both the $\overline{DCD}$ input returns to a low level and the status and receiver data register has been read. A bus-controllable internal reset function, which is part of the control logic 36, is provided which resets the status buffer, clears the transmitter and receiver shift registers, and resets all counters and control logic. In addition, an automatic power-on reset system gives start-up protection until the normal bus controlled master reset is utilized during initialization. The power-on reset circuit is cleared by the bus controlled master reset function and associated circuitry.

The functional operation of the ACIA chip 10 is as follows: ACIA chip 10 consists of three-state bus drivers and receivers and multiplexers and in section 12 of FIG. 1, and also includes selection or address logic 16, parity logic 46 and 54, a parallel-to-serial converter including transmit data register 32 and transmit shift register 40, a serial-to-parallel converter including receive shift register 52 and receive data register 38.

Since ACIA chip 10 may be interfaced to a microprocessing unit, as in FIG. 2, the awareness of the following information is necessary. In a preferred embodiment, the MPU utilizes a 16 bit memory address register and address bus (not shown). The data transfers are provided over an eight-bit bidirectional data bus 14'. The register select (RS) input 20 is utilized to select one of four internal ACIA register locations, i.e., 32, 34, 36, or 38 in conjunction with the R/W line 28. The ACIA chip 10 itself is selected by wire decoding three of the 16 address lines of the microcomputer of FIG. 2 in addition to RS input 20. The R/W control line 28 determines the direction of the data flow on bidirectional data bus 14 and is used, in addition, to aid selection of the internal registers mentioned above while Enable (E) input 30 causes the input output buffers in buffer section 12 to be enabled.

The eight-bit data bus 14 is interfaced by three-state bus drivers and receivers in section 12. Chip 10 is selected when $CS_0$ and $CS_1$ are high and $\overline{CS_2}$ is low. The R/W line causes the bus drivers to be activated by E when the MPU chip is undergoing a Read operation, for example, "reading" the ACIA chip 10 when R/W equals a logical "1," ACIA chip 10 being selected. Conversely, when the MPU is undergoing a write operation, R/W equals a logical 0, and the bus receiver circuits in section 12 are enabled. The register select (RS) input 20 selects the "data" registers (transmit data register 32 and receive data register 38 when RS equals a logical 1 and selects the status register 34 or the control register 36 when RS is equal to logical 0. The R/W line selects the "write only" registers, that is transmit data register 32 and control register 36 when R/W is at a logical 0 and selects the "read only" registers, received data register 38 and the status register 34 when R/W is equal to logical 0. The meaning of write only register is that such a register is only written into from the buffer section 12 and the bidirectional data bus 14, and is never read from such that the data is sent out on data bus 14; an analogous meaning is associated with the term read only register.

TABLE I

| Buffer Address | RS . R/W | RS . R/W | RS . R/W | RS . RW |
|---|---|---|---|---|
| Bus Line Number | Transmit Data Register (Write Only) | Receiver Data Register (Read Only) | Control Register (Write Only) | Status Register (Read Only) |
| 0 | Data Bit 0 | Data Bit 0 | Clk. Divide Sel. | Rx Data Rg. Full |
| 1 | Data Bit 1 | Data Bit 1 | Clk. Divide Sel. | Tx Data Reg. Empty |
| 2 | Data Bit 2 | Data Bit 2 | Word Sel. 1 | Data Carrier Det. loss |
| 3 | Data Bit 3 | Data Bit 3 | Word Sel. 2 | Clear to Send |
| 4 | Data Bit 4 | Data Bit 4 | Word Sel. 3 | Framing Error |
| 5 | Data Bit 5 | Data Bit 5 | Tx Control 1 | Overrun (OVRN) |
| 6 | Data Bit 6 | Data Bit 6 | Tx Control 2 | Parity Error (PE) |
| 7 | Data Bit 7 | Data Bit 7 | Rx Interrupt Enable | Interrupt Request |

Table 1 defines the functions of the transmit data register 32, the receive data register 38, the control register 36, and the status register 34 for a presently preferred embodiment of the invention. The combinations of the RS and R/W inputs required to select each of the registers are indicated in the "Buffer Address" row of table 1. The "Bus Line Number" designations refer to the conductors of bidirectional data bus 14 and the corresponding bits of the four abovementioned internal registers. Bits 0 and 1 of control register 36 are dedicated to selecting one of three divide clock ratios and to establishing a master reset function which resets all of the logic on the chip. Bits 2, 3 and 4 of control register 36 are dedicated to selecting one of eight different combinations of data word lengths, parity bits, and stop bits. Bits 5 and 6 of control register 36 control the "transmitter buffer empty" interrupt output, the state of the request to send ($\overline{RTS}$) output and the transmission of a "Break" level (i.e., space). Bit 7 of the control register controls interrupts being caused by the "receiver data register full" indicator and by $\overline{DCD}$. It should be noted that writing data into the transmit data register 32 causes the "transmit data empty" bit in status register 34 to go low and data can then be transmitted. Transfer of data therefrom causes the transmit data register empty bit to indicate empty. Upon receiving a complete character, data is automatically transferred to the empty receive data register 38 from receive shift register 56, which event causes the receive data register full bit in status register 34 to go high, allowing data to be read through bidirectional data bus 14. The nondestructive read cycle causes the "receive data register full" bit to be cleared. When the receive data register 38 is full, the automatic transfer of data from the receive shift register 56 is inhibited so that the contents of receive data register 38 remains valid.

The transmitting sequence consists of reading the ACIA status register 34 either as a result of an interrupt signal from circuit 50 or in the ACIA's turn in a "polling" sequence by the MPU of circuits connected to bidirection data bus 14'. The transmitter data register empty status is determined, and when empty, the write sequence is initiated and a character is loaded into the transmit data register 32. As soon as the transmit shift register 140 is available, the character in the transmit data register 32 is serialized and transmitted from the transmit data output 108 along with a leading start bit and a trailing stop bit or bits inserted by transmitter control circuit 42. Parity (odd or even) can be optionally added to the character by circuit 46 and will occur between the last data bit and the first stop bit. The word length can range between eight and nine bits (including parity) plus the start and stop bits in a presently preferred embodiment of the invention. Parity, word length, number of stop bits (one or two), clock divider ratio, and transmit interrup enable can all be selected by means of the MPU bus 14; (under program control) and the ACIA control registers. A length of break (break is defined as all spaces in the serial word format, i.e., all logical 0's) can be programmed from the MPU data bus 14'. The control bit for the break character is set to initiate break and reset to terminate the space condition. The bit rate of transmission is determined at the transmit clock frequency applied to line 128 and the clock divider select state as determined by the state of the first two control register bits.

Data is received by means of the receive data input 122. The leading mark-to-space transition (i.e., 1 to 0 transition) of the start bit synchronizes the internal clock generator with the timing of the data being received by means of sync (i.e., synchronizing) logic 60. False start bit deletion will insure against synchronizing on noise by insuring that a full one-half bit of the start time frame has been received before synchronizing to the bit time occurs. Two divide ratios are available in a presently preferred embodiment for purposes of bit synchronization. These are 16 and 64, for higher precision. The clock will be automatically synchronized to the theoretical data midpoint. When the character reception is complete, the character (word) will be automatically loaded into the receive data register 38 if it is empty. As the characters are being received, parity will be checked and the error indication, if any, will be available in the status register 34 which contains the following information. First, a framing error indicates the absence of the stop bit. Second, an overrun error indicates one or more characters have been lost. Third, the receive data register full indicator indicates a character has been received and is available for the MPU.

Fourth, the parity error bit of status register 34 indicates the number of mark bits does not agree with the even or odd parity selected. The parity bit is stripped from the data being transferred to receiver data register 38 and in the case of a seven bit word, the eighth bit will be low.

When data is transferred into the receive data register 38, the receive data register full bit of status register 34 is set and an interrupt is initiated, assuming the receiver interrupt is enabled. The MPU will then read the ACIA status register 34 to determine the source of the internal interrupt signal and whether the character is valid. The receive data register full status bit will indicate that the receive data register 38 is full and MPU chip 142 will subsequently read the receive data register 38. The interrupt and receive data register full status bit will then be reset automatically. Parity, word length, and interrupt enable are programmed via the microprocessor control bus 14' and control register 36.

If the received data register full status bit indicates receive data register 38 is full when the incoming character is complete and ready to be transferred to receive data register 38, the transfer will be inhibited and an overrun indication will be stored in an internal overrun flip-flop. When the receive data register 38 is read, transferring the last good character prior to overrunning to the bus 14, the internal overrun indication is transferred to the status register 34 and the receive data register full status bit is set. The next successive reading of the receiver data register 38 will clear the overrun status bit unless an additional overrun has occurred in the meantime.

Figure 4:
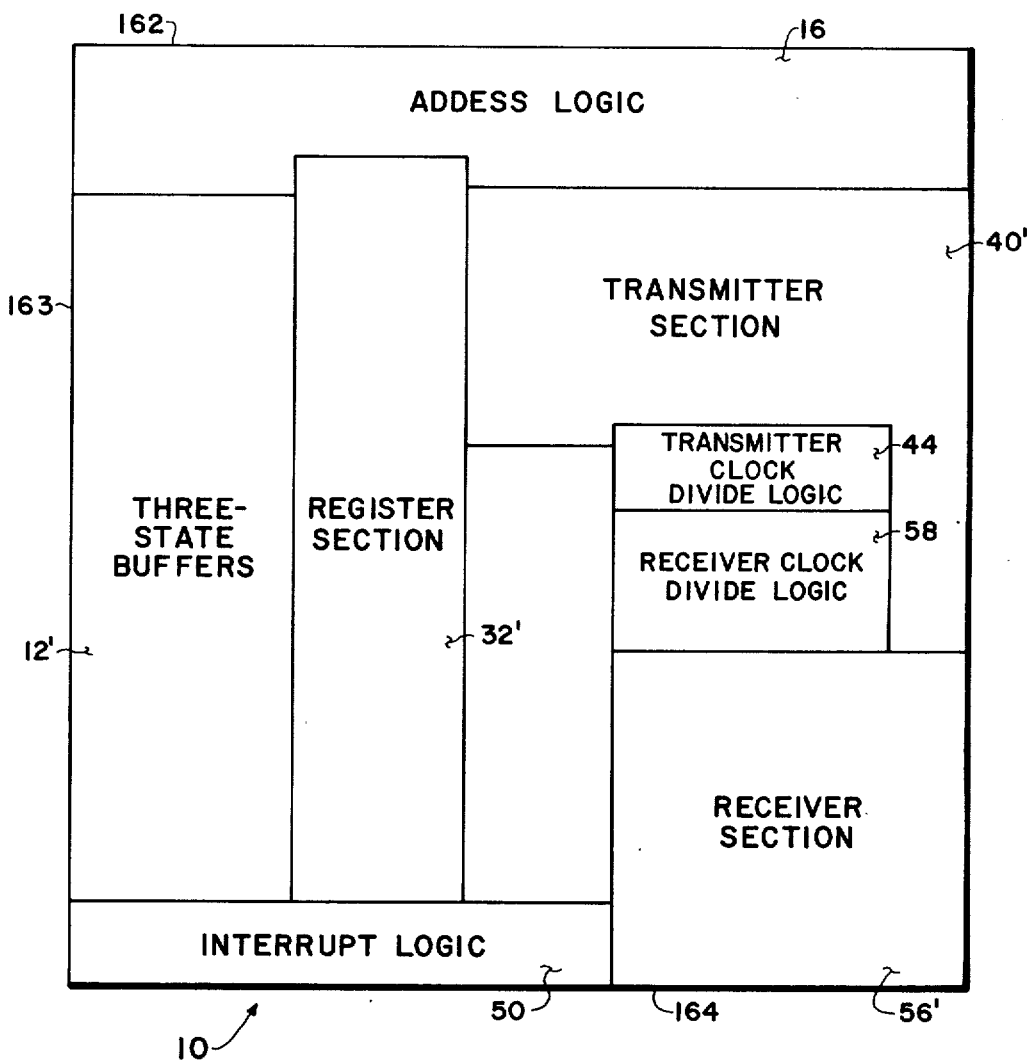
FIG. 4 is a diagram showing the topography of the various sections of a presently prepared integrated circuit semiconductor chip implementation of the system of FIG. 1.

FIG. 4 is a plan view diagram of an approximate arrangement of sections of logic circuitry on a surface of a presently preferred MOS integrated circuit semiconductor chip implementation of the asynchronous communications adaptor system of FIG. 1. In FIG. 4, semiconductor chip 10 has first, second, third, and fourth edges 161, 162, 163, and 164, respectively. Receiver section 56' is located in the lower righthand corner of FIG. 4 adjacent edges 161 and 164. Receiver section 56' includes receiver shift register 56, and part or all of parity check circuit 54, receiver control circuit 52, and sync logic circuit 60. Transmitter control section 40' essentially includes transmitter shift register 40 and may further include transmitter control circuit 42, and parity generator circuit 46. Transmitter section 40' is located along edge 161 and is partially adjacent to receiver section 56'. Transmitter section 40' includes transmitter shift register 40, and may also include portions or all of transmitter control circuit 42, clock generator 44, and parity generator 46. Address logic 16 is located on the surface of chip 10 along edge 162 adjacent transmitter section 40'. Buffer section 12' is positioned on the surface of chip 10 along edge 163 and may include generally the same circuitry as section 12 of FIG. 1. Register section 32' is located on the surface of chip 10 next to buffer section 12' and adjacent address logic 16 and transmitter section 40', and includes transmitter data register 32, status register 34, control register 36, and receiver data register 38. Interrupt logic 50 is located partially edge 164 and adjacent register section 32' receiver section 56'. Clock generator circuits 44 and 58 are located essentially between transmitter section 40', receiver section 56' and interrupt logic 50.

While the invention has been described in relation to a presently preferred embodiment thereof, those skilled in the art will recognize that variations in arrangement and placement of parts may be made within the scope of the invention to suit various requirements.

What is claimed is:

1. A digital system for controlling asynchronous data communication between a bidirectional data bus and a peripheral device comprising:
    transmitter means coupled to said peripheral device for formatting and serializing parallel data and transmitting said data to said peripheral device;
    receiver means coupled to said peripheral device for receiving serial data from said peripheral device, verifying a data format of said serial data and converting said serial data to a parallel format;
    interface buffer means coupled between said bidirectional data bus and said transmitter means and said receiving means for controlling said receiver means and said transmitter means; and
    status means coupled between said interface buffer means and said transmitter means and said receiver means for monitoring said transmitter means and said receiver means and storing information representative of status of said transmitter means and said receiver means and transferring said information through said interface buffer means to said bidirectional data bus.

2. A digital system as recited in claim 1 wherein said transmitter means includes a transmitter data register coupled to said interface buffer means and a transmitter shift register having inputs coupled to said transmitter data register and a transmitter data output.

3. A digital system as recited in claim 2 wherein said transmitter means further includes transmitter control logic circuitry coupled to said transmitter shift register, clock generating circuitry coupled to said transmitter shift register and to an external transmitter clock input, and parity generation circuitry coupled to said transmitter.

4. A digital system as recited in claim 1 further including control register means coupled to said transmitter means and said receiver means for controlling data transfers associated with said transmitter means and said receiver means.

5. A digital system as recited in claim 4 wherein said control register means is coupled to said clock generating circuit, said transmitter control circuit and said parity generation circuit for controlling under program control data transfers associated with said transmitter means.

6. A digital system as recited in claim 4 wherein said control register means has an output adapted to be coupled to an external peripheral device for generating a request to send signal thereon.

7. A digital system as recited in claim 4 wherein said transmitter control logic includes an input adapted to be coupled to a peripheral device for sending a clear-to-send signal.

8. A digital system as recited in claim 3 further including interrupt logic circuitry coupled to an output of said digital system for generating an interrupt signal and also coupled to said control register and said status means.

9. A digital system as recited in claim 4 further including clock selection logic circuitry coupled to said clock generator logic and said control register means for controlling, under program control, a divide ratio of said clock generator.

10. A digital system as recited in claim 1 wherein said interface buffer means includes address logic circuitry means coupled to selection inputs and control inputs of said digital system for selecting said digital system and for selecting registers within said digital system.

11. A digital system as recited in claim 1 wherein said receiver means includes a receiver data register coupled to said interface buffer means and a receiver shift register having outputs coupled to said receiver data register and a receiver data input.

12. A digital system as recited in claim 11 wherein said receiver means further includes receiver control logic circuitry coupled to said receiver shift register, clock generating circuitry coupled to said receiver shift register and to an external receiver clock input, and parity detection circuitry coupled to said transmitter shift register.

13. A digital system as recited in claim 4 wherein said receiver control logic includes an input adapted to be coupled to a peripheral device for receiving a data carrier loss signal.

14. A digital system as recited in claim 1 on a semiconductor chip having first, second, third, and fourth edges thereof, in sequence wherein said receiver means is located at said surface adjacent said first and fourth edges, said transmitter means is located at said surface adjacent another portion of said first edge, and said interface buffer means is located at said surface adjacent said third edge.

15. A digital system as recited in claim 10 on a semiconductor chip having first, second, third, and fourth edges and a surface thereof, in sequence, wherein said receiver means is located at said surface adjacent said first and fourth edges, and transmitter is located at said surface adjacent another portion of said first edge, and said interface buffer means is located at said surface adjacent said third edge.

16. The digital system as recited in claim 15 wherein said interface buffer means further includes address logic circuit means located on said surface adjacent said second edge.

17. The digital system as recited in claim 16 further including interrupt logic circuitry partially located adjacent said fourth edge and partially located interior to said surface adjacent said control register means and said receiver means.

18. The digital system as recited in claim 17 further including clock divide logic circuitry at said surface adjacent said transmitter means and said receiver means.

19. A digital system as recited in claim 14 wherein said semiconductor chip is an MOS semiconductor chip.

20. A method of operating a digital system for asynchoronous data communication including a receiver means, a transmitter means, and an interface buffer means comprising the steps of:
    accepting data from a bidirectional data bus into said interface buffer means in a parallel data format, transferring said data to said transmitter means and converting said data to a serial data format, and transmitting said data in serial fashion to a peripheral unit coupled to said digital system;
    receiving other data in serial format from said peripheral unit and accepting said other data in said receiver means and converting said other data to a parallel data format, and transferring said other data from said receiver means into said interface buffer means and transferring said other data in parallel form to said bidirectional data bus; and storing information representative of the status of said receiver means and said transmitter means in a status register means coupled between said interface buffer means, said transmitter means, and said receiver means, and transferring said information from said status register means to said bidirectional data bus.

21. The method as recited in claim 20 wherein said digital system is contained on a semiconductor chip.

* * * * *